United States Patent Office 3,313,816
Patented Apr. 11, 1967

3,313,816
PROCESSES OF PRODUCING 4-AMINO-6-HYDROXYPYRIMIDINE
Yasuo Fujimoto and Yasuki Mori, Tokyo, Japan, assignors to Kyowa Hakko Kogyo K.K. (Kyowa Fermentation Industry Co. Ltd.), Tokyo-to, Japan, a corporation of Japan
No Drawing. Filed July 14, 1965, Ser. No. 472,016
Claims priority, application Japan, July 20, 1964, 39/40,399
11 Claims. (Cl. 260—256.4)

This invention relates to processes for the production of 4-amino-6-hydroxypyrimidine and more particularly to one step processes for the production of 4-amino-6-hydroxypyrimidine directly from β-amino-β-alkoxyacrylic acid esters or acid salts thereof.

4-amino-6-hydroxypyrimidine is useful as a synthetic intermediate in the synthesis of hypoxanthine which is employed as a raw material for medicaments and flavoring media for foods. In the past, attempts have been made to obtain 4-amino-6-hydroxypyrimidine by the removal of the mercapto group in 2-mercapto-4-amino-6-hydroxypyrimidine or by condensing malonamamidine, also called 2-amidino acetamide, with ethyl formate. The former process has the disadvantage of requiring numerous and complicated steps, while the latter process results in particularly poor yields.

With the object of obtaining 4-amino-6-hydroxypyrimidine in good yield by a less complicated process than those used in the past, the present inventors conducted studies which resulted in the discovery of a process for the production of 4-amino-6-hydroxypyrimidine which is described in Japanese application 63,007/63, filed Nov. 26, 1963. Through more extensive research, the present inventors have now achieved the production of 4-amino-6-hydroxypyrimidine in better yield, more economically and effectively by one-step processes without the isolation of any of the intermediates.

In accordance with this invention, an ester of β-amino-β-alkoxyacrylic acid or an acid salt of such ester, for example, a hydrochloride of such ester, is reacted with ammonia. Conveniently, the ester or its salt may be dissolved in an inert solvent or in formamide. Desirably, the solution of the acrylic acid ester is placed in a closed vessel, saturated with ammonia gas or absorbed with excess amount of ammonia gas and maintained at room temperature for several days, such as 2 to 8 days. Alternately, the solution of the ester may be placed in a pressure vessel and heated with reflux or otherwise for a period of one to eight hours. The reaction which takes place between ammonia and an alkyl ester of β-amino-β-alkoxyacrylic acid may be represented as follows:

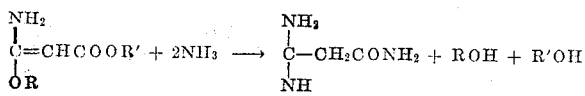

in which R is lower alkyl having not more than 5 carbon atoms, such as methyl, ethyl or butyl, and R' is alkyl and desirably lower alkyl having not more than 5 carbon atoms. Examples of inert solvents which may be employed to dissolve the esters of β-amino-β-alkoxyacrylic acid or acid salts of such esters are: monohydric alcohols, such as methanol, ethanol or butanol; polyhydric alcohols, such as glycol, ethylene glycol and propylene gycol; ethers, such as methyl ethyl ether and butyl ether, ethylene glycol di-lower alkyl ethers and diethylene glycol di-lower alkyl ethers (carbitols); alcohol ethers, such as ethylene glycol monoalkyl ether (Cellosolves) and diethylene glycol. mono-lower alkyl ethers (carbitols); and dioxane. One or a plurality of esters of β-amino-β-alkoxyacrylic acid or salts of such esters may be employed as the starting material.

After the malonamamidine is formed, the ammonia is desirably removed. If the formamide is not employed as the solvent for the esters of β-amino-β-alkoxyacrylic acid or salts of such esters, a quantity of sufficient formamide is added to condense with the malonamamidine formed in the reaction of the esters with ammonia. An alkali metal lower alkoxide, such as sodium methoxide, sodium ethoxide, sodium butoxide or potassium ethoxide is added in the form of a powder or solution in an inert solvent. Desirably, the reaction mixture is refluxed for a period of 1 to 24 hours. The reaction which occurs may be represented as follows when sodium methoxide is used as the condensing catalyst:

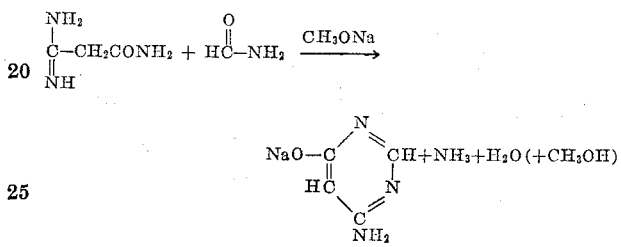

The alkali salt of 4-amino-6-hydroxypyrimidine produced is dissolved in water directly by adding water to the reaction mixture when the reaction solvent is of a hydrophilic nature; on the other hand, when the solvent is of a hydrophobic nature, it is removed from the reaction mixture by distillation and the residual product is then dissolved in water.

The 4-amino-6-hydroxypyrimidine produced may be conveniently recovered by utilization of ion exchangers. The alkali metal salt of the 4-amino-6-hydroxypyrimidine obtained is passed through and sorbed on an anion exchanger of the OH type. After washing the anion exchanger with water, the 4-amino-6-hydroxypyrimidine is eluted in the form of the acid salt with a mineral acid, such as hydrochloric, sulfuric or phosphoric acid. It may be further purified by passing the resulting eluate through a cation exchanger in the hydrogen condition. It may then be eluted with an aqueous solution of ammonia to obtain the free 4-amino-6-hydroxypyrimidine.

A more comprehensive understanding of this invention is obtained by reference to the following examples:

*Example 1*

24.5 grams of the hydrochloride of the ethyl ester of β-amino-β-ethoxyacrylic acid are dissolved in 245 ml. of methanol and saturated with ammonia gas, then sealed tightly in a suitable vessel, which is maintained at room temperature for 5 days. There is then added to the vessel 13.5 grams of formamide and a methanol solution containing 21.6 grams of sodium methoxide. The reaction solution is boiled under reflux for 24 hours. Water is added to dissolve the separated crystals and to make up the amount of the reaction solution to a total of 3 liters. The resulting solution is passed through 500 ml. of strongly basic anion exchanger, such as Amberlite IRA 400, OH type. Amberlite IRA 400 is a polystyrene quaternary ammonium resin manufactured by Rohm & Haas, of Philadelphia, Pa. After washing the exchanger with water, 2 N of hydrochloric acid is passed through the washed anion exchanger to elute 4-amino-6-hydroxypyrimidine in the form of an acid salt. After concentrating of the eluate under the reduced pressure, a yield of 16.1 grams of 4-amino-6-hydroxypyrimidine hydrochloride was obtained. Ultraviolet absorption curves, paper chromatography and elementary analysis confirmed the identity of the product as 4-amino-6-hydroxypyrimidine hydrochloride, which is substantially identical with the product prepared by conventional processes.

*Example 2*

16.4 grams of the methyl ester of β-amino-β-methoxyacrylic acid are diluted in 200 ml. of methyl Cellosolve (ethylene glycol monomethyl ether) and sealed tightly in a suitable pressure vessel in which ammonia gas replaces the air. Ammonia gas is introduced in the vessel until the gauge pressure in the vessel rises to 10 kg. per square centimeter. The temperature of the reaction mixture is maintained at 65° C. for 4 hours by heating the vessel. After thoroughly exhausting the ammonia gas, there are added to the reagents 15.0 grams of formamide and 30.6 grams of sodium ethoxide. The ingredients are then boiled under reflux for 4 hours. After refluxing, the reaction mixture is cooled and water is added to the reaction mixture to make up the volume of reaction solution to a total of 3.23 liters, which is then treated in the same manner as described in Example 1. There was obtained 14.4 grams of 4-amino-6-hydroxypyrimidine in the form of the hydrochloride salt which was then dissolved in water and passed through strongly acidic cation exchanger, such as Amberlite IR 120, H type. Amberlite IR 120 is a polystyrene sulfonic acid resin manufactured by Rohm & Haas, of Philadelphia, Pa. After washing the exchanger with water, a 2 N aqueous solution of ammonia is passed through the washed exchanger to elute therefrom 4-amino-6-hydroxypyrimidine. After concentrating the eluate under the reduced pressure, there was obtained 14.0 grams of free 4-amino-6-hydroxypyrimidine from the eluate. Ultraviolet absorption curves, paper chromatography and elementary analysis confirmed the identity of free 4-amino-6-hydroxypyrimidine. The free 4-amino-6-hydroxypyrimidine obtained is substantially identical with the product when prepared by conventional processes.

What is claimed is:

1. In the process of producing 4-amino-6-hydroxypyrimidine, the steps comprising reacting a member selected from the class consisting of lower alkyl esters of β-amino-β-lower alkoxyacrylic acid and mineral acid salts thereof with ammonia to form malonamamidine and condensing said malonamamidine without isolation with formamide in the presence of an alkali metal lower alkoxide to form 4-amino-6-hydroxypyrimidine, the lower alkyl group of said esters having not more than 5 carbon atoms.

2. In the process of producing 4-amino-6-hydroxypyrimidine in accordance with claim 1, in which the ammonia reacts with said member in a closed container at room temperature.

3. In the process of producing 4-amino-6-hydroxypyrimidine in accordance with claim 1, in which the same member is dissolved in an inert solvent and ammonia is introduced into the resulting solution in a pressure container.

4. In the process of producing 4-amino-6-hydroxypyrimidine in accordance with claim 1, in which the ammonia reacts with said member in a closed container at elevated temperature.

5. In the process of producing 4-amino-6-hydroxypyrimidine in accordance with claim 1, in which the condensation of malonamamidine with formamide in the presence of alkali metal lower alkoxide is carried out at a temperature below about the refluxing point of the reaction mixture.

6. The process of producing an acid salt of 4-amino-6-hydroxypyrimidine which comprises reacting ammonia with a lower alkyl ester of β-amino-β-lower alkoxyacrylic acid to produce malonamamidine, condensing in the presence of an alkali metal lower alkoxide said malonamamidine without isolation with formamide to form an alkali metal salt of 4-amino-6-hydroxypyrimidine, passing a water solution of said alkali metal salt of 4-amino-6-hydroxypyrimidine through an anion exchanger of the OH type and eluting with a mineral acid the sorbed 4-amino-6-hydroxypyrimidine from said anion exchanger to produce a mineral acid salt of 4-amino-6-hydroxypyrimidine, the lower alkyl group of said ester having not more than 5 carbon atoms.

7. The process of producing an acid salt of 4-amino-6-hydroxypyrimidine which comprises reacting ammonia with an acid salt of a lower alkyl ester of β-amino-β-lower alkoxyacrylic acid to produce malonamamidine, condensing in the presence of an alkali metal lower alkoxide said malonamamidine without isolation with formamide to form an alkali metal salt of 4-amino-6-hydroxypyrimidine, passing a water solution of said alkali metal salt of 4-amino-6-hydroxypyrimidine through an anion exchanger of the OH type and eluting with a mineral acid the sorbed 4-amino-6-hydroxypyrimidine from said anion exchanger to produce a mineral acid salt of 4-amino-6-hydroxypyrimidine, the lower alkyl group of said ester having not more than 5 carbon atoms.

8. The process of producing 4-amino-6-hydroxypyrimidine which comprises reacting ammonia with a lower alkyl ester of β-amino-β-lower alkoxyacrylic acid to produce malonamamidine, condensing in the presence of an alkali metal lower alkoxide said malonamamidine without isolation with formamide to form an alkali metal salt of 4-amino-6-hydroxypyrimidine, passing a water solution of said alkali metal salt of 4-amino-6-hydroxypyrimidine through an anion exchanger of the OH type, eluting with a mineral acid the sorbed 4-amino-6-hydroxypyrimidine from said anion exchanger to produce a mineral acid salt of 4-amino-6-hydroxypyrimidine, passing a water solution of said 4-amino-6-hydroxypyrimidine through a cation exchanger of the hydrogen type and eluting with ammonia the sorbed 4-amino-6-hydroxypyrimidine from said cation exchanger to produce free 4-amino-6-hydroxypyrimidine, the lower alkyl group of said ester having not more than 5 carbon atoms.

9. The process of producing 4-amino-6-hydroxypyrimidine which comprises reacting ammonia with an acid salt of a lower alkyl ester of β-amino-β-lower alkoxyacrylic acid to produce malonamamidine, condensing in the presence of an alkali metal lower alkoxide said malonamamidine without isolation with formamide to form an alkali metal salt of 4-amino-6-hydroxypyrimidine, passing a water solution of said alkali metal salt of 4-amino-6-hydroxypyrimidine through an anion exchanger of the OH type, eluting with a mineral acid the sorbed 4-amino-6-hydroxypyrimidine from said anion exchanger to produce a mineral acid salt of 4-amino-6-hydroxypyrimidine, passing a water solution of said 4-amino-6-hydroxypyrimidine through a cation exchanger of the hydrogen type and eluting with ammonia the sorbed 4-amino-6-hydroxypyrimidine from said cation exchanger to produce free 4-amino-6-hydroxypyrimidine, the lower alkyl group of said ester having not more than 5 carbon atoms.

10. The process of producing an acid salt of 4-amino-6-hydroxypyrimidine which comprises forming a solution of an acid salt of a lower alkyl ester of β-amino-β-lower alkoxyacrylic acid, saturating the solution with ammonia, subjecting the resulting saturated solution at room temperature in a closed system, adding formamide and an alkali metal lower alkoxide to the reaction mixture, refluxing the mixture, adding sufficient water to dissolve separated crystals, passing a water solution of said refluxed product through an anion exchanger of the OH type and eluting said anion exchanger with a mineral acid to recover a mineral acid salt of 4-amino-6-hydroxypyrimidine, the lower alkyl group of said ester having not more than 5 carbon atoms.

11. The process of producing 4-amino-6-hydroxypyrimidine comprising subjecting at elevated temperature, a solution of a lower alkyl ester of β-amino-β-lower alkoxyacrylic acid to the action of ammonia under pressure, removing ammonia gas from the mixture, adding formamide and an alkali metal lower alkoxide to the reaction mixture, refluxing the reaction mixture, adding sufficient water to dissolve separated crystals, converting the 4-amino-6-hydroxypyrimidine to a mineral acid salt, dissolving the acid salt in water, passing the resulting solution through a strongly acidic cation exchanger and eluting said cation exchanger with an aqueous solution of ammonia to recover free 4-amino-6-hydroxypyrimidine, the lower alkyl group of said ester having not more than 5 carbon atoms.

No references cited.

ALEX MAZEL, *Primary Examiner.*

MARY O'BRIEN, *Assistant Examiner.*